Figure 1:
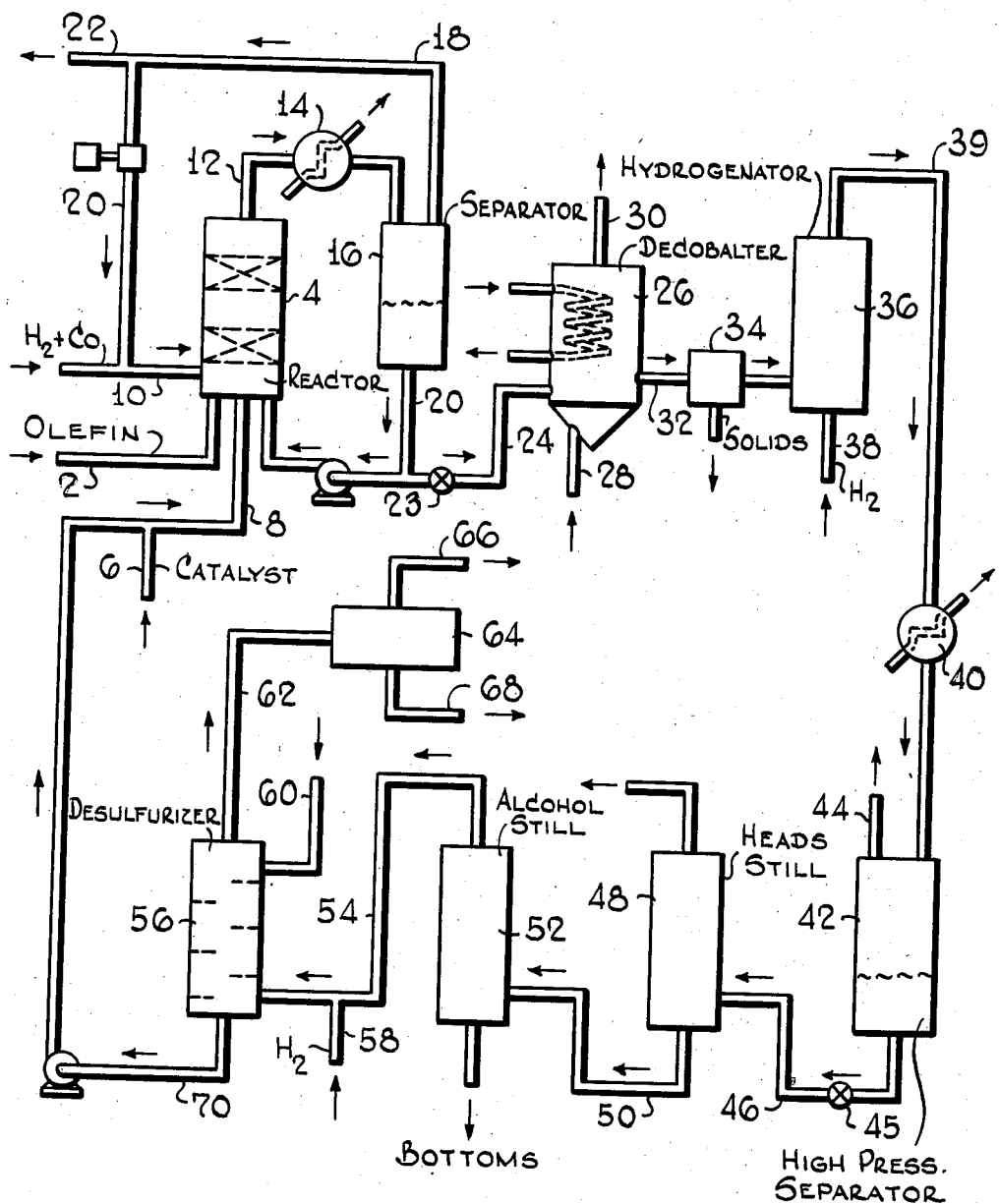
Figure 2:
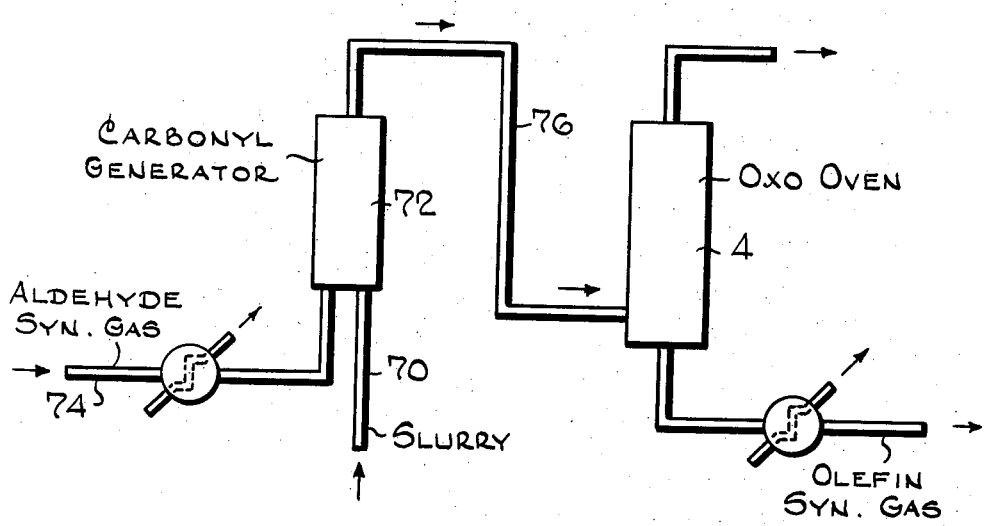
Figure 3:
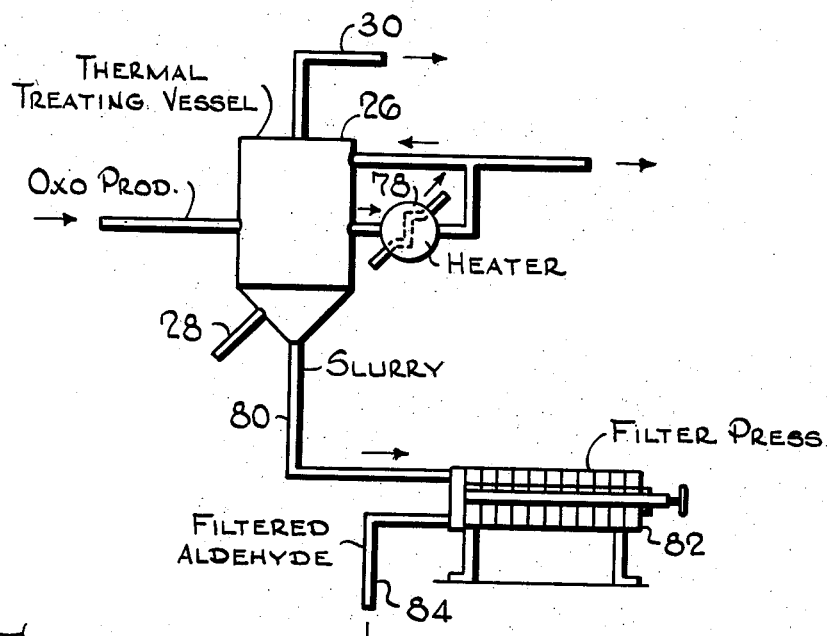
Figure 4:
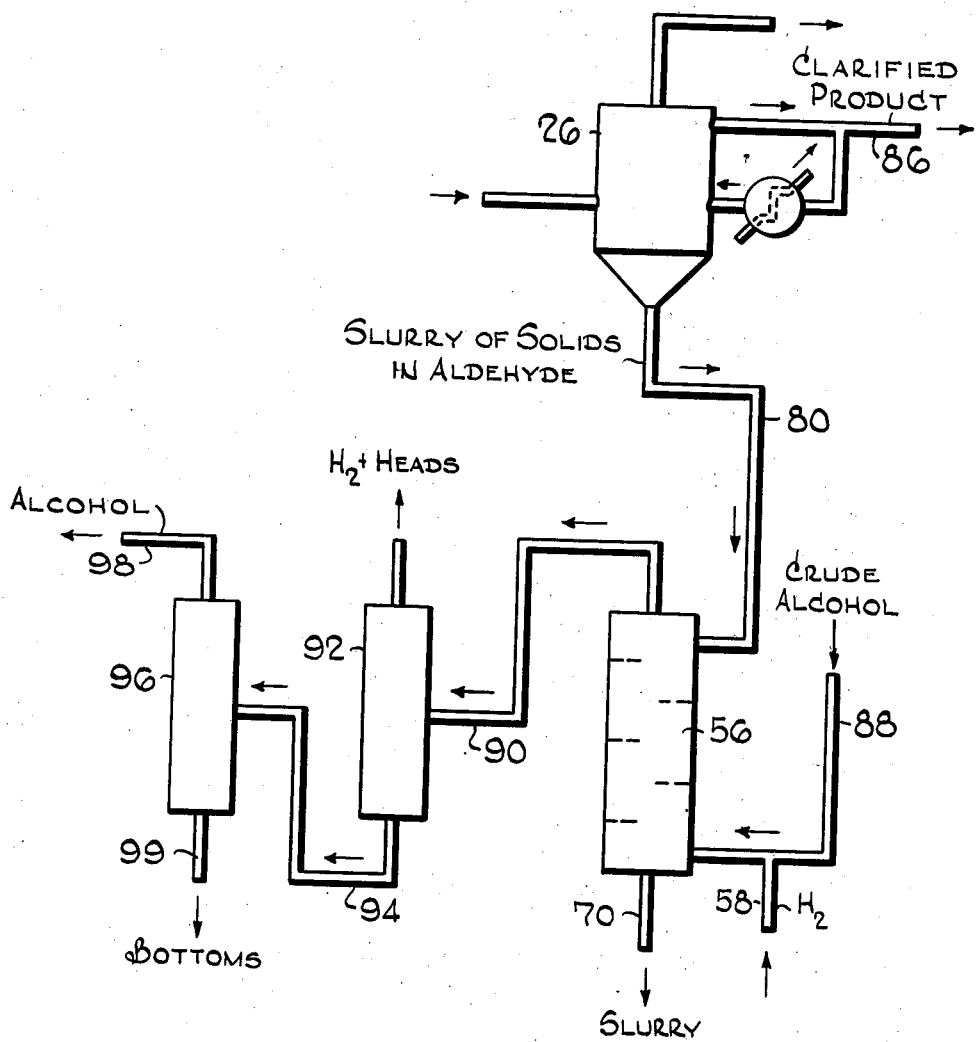

Jan. 25, 1955  W. E. CATTERALL  2,700,687
DESULFURIZATION OF OXO ALCOHOLS
Filed March 29, 1952  3 Sheets-Sheet 3

William E. Catterall Inventor
By Henry Berk Attorney

United States Patent Office 2,700,687
Patented Jan. 25, 1955

2,700,687

DESULFURIZATION OF OXO ALCOHOLS

William E. Catterall, Roselle, N. J., assignor to Standard Oil Development Company, a corporation of Delaware Application March 29, 1952, Serial No. 279,430

10 Claims. (Cl. 260—638)

The present invention relates to the preparation of oxygenated organic compounds from olefins by reacting the latter with CO and $H_2$ in the presence of carbonylation catalysts. More specifically, the present invention relates to the purification of alcohol products obtained by the hydrogenation of the aldehyde products derived from this process, particularly when said aldehyde product is hydrogenated in the presence of a sulfur-insensitive catalyst.

The synthesis of oxygenated organic compounds from olefinic compounds and mixtures of CO and $H_2$ in the presence of a catalyst containing metals of the iron group, such as, cobalt or iron, preferably the former, is well known in the art. In the first stage, the olefinic material, catalyst and the proper proportions of CO and $H_2$ are reacted to give a product consisting essentially of aldehydes containing one more carbon atom than the reacted olefin. This oxygenated organic mixture, which contains dissolved in it salts and the carbonyls and molecular complexes of the metal catalyst, is treated in a second stage to cause removal of soluble metal compounds, such as carbonyls, from the aldehyde product in a catalyst removal zone. The catalyst-free aldehyde product is then generally hydrogenated to the corresponding alcohols, and it is to the alcohol thus produced that the present invention applies.

This carbonylation reaction provides a particularly attractive method of preparing valuable primary alcohols which find large markets particularly as intermediates for plasticizers, detergents and solvents. Amenable to the reaction are long and short chain olefinic and oxygenated olefinic compounds. Thus, straight and branch chained olefins and di-olefins, propylene, butylene, styrene, olefin polymers, such as, di- and tri-isobutylene, polypropylene fractions, olefinic fractions from thermal or catalytic cracking processes and the like, may be used as starting materials.

The catalyst in the first stage may be added as oil-soluble salts of the catalytically active metal with high molecular weight fatty acids, such as, oleic, stearic, naphthenic, and the like, or it may be added as a slurry of the metal or its compounds, or as the carbonyl. Inasmuch as the active catalyst is probably the hydrocarbonyl of the metal, such as cobalt hydrocarbonyl, most forms of the metal may be employed as catalyst, and these are converted into the active species in the course of the reaction.

The synthesis gas mixture fed to the first stage may consist of any ratio of $H_2/CO$; preferably the gases are present in about equal proportions. The conditions for reacting $H_2$ and CO vary somewhat in accordance with the nature of the olefin feed and catalyst form, but the reaction is generally conducted at about 2000–4500 p. s. i. g. and at temperatures in the range of about 250°–450° F. The ratio of synthesis gas to olefin feed may vary widely; in general, about 2500 to 15,000 cu. ft. of $H_2$ and CO per barrel of olefin feed are employed.

Following the carbonylation stage, the aldehyde product, containing in solution, a considerable amount of dissolved catalyst in the form of carbonyl and other compounds, is generally treated at elevated temperatures in the presence of a gas or vapor, such as, hydrogen or steam, to decompose the carbonyl to an oil-insoluble form of cobalt or other metal, and drive off CO formed. Thereafter, the aldehyde product is freed of suspended catalyst metal or compounds, and is passed to a hydrogenation zone for conversion into alcohols.

The hydrogenation stage may be operated at conventional hydrogenation conditions including temperatures, pressures, and gas and liquid feed rates of the same order of magnitude as those obtaining in the first, or carbonylation stage. Various known types of catalyst, such as, nickel, tungsten, molybdenum and their oxides or sulfides, supported or unsupported, may be used. The sulfide catalysts have been found to be especially useful for carrying out this hydrogenation.

The liquid product from the primary hydrogenation stage is worked up by distillation to separate the desired alcohols from unconverted olefinic feed material, unhydrogenated carbonyl compounds, and hydrocarbons formed in the process.

The overall carbonylation or so-called "Oxo" reaction as outlined above, provides a particularly effective method for preparing valuable primary alcohols, particularly of the $C_4$ to $C_{20}$ range, which find large markets as intermediates for detergents and plasticizers. The $C_8$ and $C_9$ Oxo alcohol products are especially preferred for use in forming esters to be used as plasticizers in light colored or colorless plastics and resins.

Serious difficulties have been encountered in the primary hydrogenation stage as a result of sulfur poisoning of certain hydrogenation catalysts, when the catalysts used are those, such as, elementary nickel, and others which are sulfur-sensitive. The most readily available olefinic feed stocks for the oxonation reaction are selected hydrocarbon streams derived from petroleum refinery sources and these frequently have sulfur contents as high as 0.1% or even higher. Furthermore, there are a variety of other ways in which sulfur may be introduced into the alcohol product during both the oxonation and hydrogenation stages for reducing the carbonyl compounds. For instance, the fatty acids used to form the metal oxonation catalyst for the purpose of introducing the metal into the reactor as the metallic naphthenate, stearate, or oleate, will usually be found to contain small amounts of sulfur-containing compounds as contaminants, particularly when the fatty acids themselves are of petroleum origin as they frequently are. The synthesis gas used in the oxonation zone, which is primarily a mixture of carbon monoxide and hydrogen, also may contain sulfur impurities and, in fact, the gaseous reactants employed in both stages of the Oxo reaction usually contain at least traces of sulfur impurities.

Sulfur which is present in the crude reaction mixture containing the carbonyl compounds tends to be carried through the oxonation stage into the hydrogenation stage where it combines with the hydrogenation catalyst to diminish, and even completely destroy, catalyst activity, unless sulfur-insensitive catalysts are used. The sulfur-sensitive hydrogenation catalysts are generally of the elementary metallic type and the deactivating effect of the sulfur on their activity requires frequent reactivation, catalyst replacement, and increased amounts of a catalyst whose cost is definitely a commercial factor and may be prohibitively high. Thus, it has been considered necessary for optimum operation in the hydrogenation step to employ a sulfur-insensitive catalyst. These sulfur-insensitive catalysts include particularly certain metallic sulfide hydrogenating catalysts, examples of such catalysts being nickel sulfide, molybdenum sulfide, tungsten sulfide, and mixtures thereof. While these catalysts have the decided advantage of avoiding the inactivation due to sulfur content of the feed stock, they also possess the disadvantage of permitting much of the sulfur to pass unchanged through the hydrogenation zone and, indeed, in many instances, as when freshly sulfided, tend to introduce additional sulfur contamination into the alcohol. Thus, the final crude alcohol may have a total sulfur content of from 30–100 p. p. m., or in some cases, even higher value.

One of the largest and most important uses developed for the synthetic alcohol products is that of producing esters suitable for plasticizers, by reaction with aliphatic, alicyclic, and aromatic acids or anhydrides, including such examples are phthalic acid, maleic acid, adipic acid, and also, phthalic and maleic acid anhydrides. Certain of the synthetic alcohols prepared by the oxonation and hydrogenation reaction are known to be especially suitable for the manufacture of ester plasticizers, and particularly for use in clear plastics. These include alcohols from $C_4$ to $C_{20}$ range, such as, the butyl alcohols, the octanols, and the nonanols.

These esters are prepared in standard type esterification equipment employing reactors made of stainless steel or other metal, or, in some cases, in glass-lined reaction vessels. In some instances, particularly when the esters were produced in reactors having metallic surfaces exposed to the reacting mixtures, the products were found to be deficient as to the standards required for plasticizers, in such characteristics as odor, color, and plasticizing qualities, such as, the poor weathering tendency of the resins and plastics in which such plasticizers are used. These undesirable characteristics are believed to be primarily caused by impurities present in the alcohol product and certain of them are caused particularly by the sulfur products present in the alcohol, although other materials which can affect ester color and odor include polymerized and condensed higher molecular weight impurities as well as unreduced carbonyl compounds and other non-alcoholic compounds. It has further been discovered that when sulfur compounds, especially those of the acidic type, are allowed to remain in impure alcohol or aldehyde, they act as catalysts for causing increased condensation reactions which produce acetals and other high molecular weight impurities of the undesirable type. In fact, it has been found that, in order to obtain a high grade alcohol which adequately meets all specifications, the active, color-producing sulfur content should best be reduced to a value somewhere near five parts per million, although somewhat higher total sulfur concentrations can be tolerated, the exact limit of tolerance depending upon the form in which the sulfur occurs.

In general, the sulfur in the synthetic Oxo alcohols is in the form of organically combined sulfur. Although all types of organic impurities in which the sulfur occurs have not been fully determined, it is believed that the sulfur is present in a variety of forms and that it is generally deleterious in most forms when ccurring in the final alcohol. Sulfur-containing contaminants cause both odor and color problems as well as act as accelerators to give unwanted properties to the alcohols. The finished alcohol should contain a minimum of sulfur-containing compounds. It is also the best practice to remove most of the carbonyl compounds and potential carbonyl compounds to obtain alcohols which give ester plasticizers of acceptable quality. These purifications are especially necessary if the ester is manufactured in stainless steel equipment and unreacted or excess alcohol is recycled to the esterification zone. A number of types of sulfur-containing impurities are believed to be present and among those probable in an iso-octyl alcohol product prepared from a $C_7$ olefin, are iso-octyl mercaptan, iso-octyl sulfide, diethyl sulfide, diethyl disulfide, dipropyl sulfide, dipropyl disulfide, butyl sulfide, as well as the corresponding sulfinic acids, sulfonic acids, sulfoxides and sulfones.

In typical alcohol recycle esterification operations, a 1% to 20% molal excess of alcohol is used based on the quantity of phthalic anhydride used. The esterification reaction is carried to substantial completion by esterification for a sufficient time. The unreacted alcohol is then stripped off from the ester product under reduced pressure and blended with fresh alcohol for returning to the esterification zone. Thus, undesirable color and odor forming materials, including sulfur-containing impurities, have the opportunity to build up during the recycle stages to a point at which they must be purged from the system before continuing the recycling operation. This presents impurity problems which occur even though the actual reaction is carried out in corrosion-resistant or glass-lined equipment.

A further problem arises when the alcohols are produced over a sulfur-resistant catalyst, such as molybdenum or tungsten sulfide. As pointed out previously, these catalysts have the great advantage of long life, physical strength and resistance against poisoning by carbon monoxide and sulfides. However, they require generally somewhat more elevated temperatures than the sulfur sensitive catalysts, such as, nickel. At these elevated temperatures, about 400°–550° F., there has been observed the tendency, especially with freshly prepared catalyst, for sulfur to be lost from the catalyst and appear in the alcohol stream. The amounts are relatively small, and relatively difficult to detect and, in most operations, would not raise difficulties. But in the case where alcohols are prepared for utilization as plasticizer intermediates, these small amounts of sulfur play an important role in degrading the product and making it unfit for use as a plasticizer. Thus, there results an economic loss, either in a sizable production of low-grade product, or loss in production while the catalyst is being conditioned on other feed stocks, or investment in special treating equipment or hydrodesulfurization facilities to be used only part time. Thus, in a commercial plant operation manufacturing octyl alcohol from $C_7$ olefin and passing the intermediate aldehyde product over freshly prepared molybdenum sulfide catalyst supported on activated carbon, the alcohol product from the first three days' production analyzed for about 12 parts per million of sulfur and produced a $KA_2$ ester color of 0.35. Even with this small amount of sulfur, the alcohol was unsuitable for use as a plasticizer intermediate for later esterification with phthalic anhydride. The ester color is a measure of the optical density of the phthalate ester as produced under prescribed conditions in the presence of stainless steel, and is affected by the presence of extremely small amounts of sulfur impurities. The optical density is measured with a spectrophotometer at a wavelength of 4470 Å. The color measurements are expressed as the absorbency in a 1.0 cm. cell relative to that of distilled water. A value of 2.0 indicates a strong brown color, and a value of 0.10 indicates a very pale straw color.

It has, in the past, been a difficult and expensive process to remove the undesirable products present in the carbonylation alcohol, either directly from the latter, or from the feed streams to the carbonylation process. Thus, for example, in the production of iso-octyl alcohol by reacting a heptene fraction with CO and $H_2$, it has been customary to recover the alcohol by caustic washing the crude hydrogenated product to remove acidic constituents, followed by distillation to remove unreacted feed stock as well as the by-products of the reaction. As discussed previously, the finished product, to be satisfactory for many desired uses, must have an extremely low sulfur, carbonyl and olefin content, and when the tolerances for these have been exceeded, it has been difficult to improve the product quality economically. Re-distillation has usually proved inadequate as have steps, such as severe caustic washing, mild oxidation, treatment with metal salt solutions, and other palliatives. The most effective measures, in the past, have been careful selection or processing of feed stocks for low sulfur content, and the use of a second hydrogenation or hydrodesulfurization step, employing a very active but readily poisoned catalyst, such as nickel. Aside from the added investment and operating costs involved, these measures may severely limit the availability of suitable feed stocks for the process.

It has been found that a particularly effective method of removing sulfur-containing impurities in the crude alcohol product is to treat the latter with an active hydrogenation catalyst under conditions to remove the sulfur, such as by converting the same into $H_2S$, but under conditions mild enough not to convert alcohol to hydrocarbons. This hydrodesulfurization process may be carried out at pressures of between 0 and 4500 p. s. i. g. and moderate temperatures of 200° to 400° F. Suitable catalysts are nickel, cobalt and other active hydrogenation catalysts of the metallic type. Desirable as such a clean-up operation is, it has in the past, been considered uneconomical and not suitable for a commercial scale operation because of the deactivation of the catalyst and the formation of corresponding sulfide. Nickel and cobalt sulfides, for instance, are not readily regenerable and experience has shown that when such a sulfided and deactivated catalyst is regenerated and converted into the metal, the latter is never as active as the original metal had been. It would be highly desirable, therefore, if an economically feasible hydrodesulfurization process could be found wherein the resulting deactivated catalyst could be re-utilized in the process.

It is, therefore, the principal object of the present invention to provide a process for hydrodesulfurizing contaminated Oxo alcohols in a manner providing highest economic utilization of the hydrodesulfurization catalyst.

It is also an object of the invention to provide a continuous and cyclic process for producing and purifying synthetic alcohols by the same catalyst.

Other and further objects of the invention will be made more clear hereinafter.

In accordance with the present invention, the alcohols produced by the interaction of carbon monoxide, hydrogen and olefin and a cobalt catalyst and hydrogenated, preferably in the presence of a sulfactive catalyst, such as molybdenum sulfide, are desulfurized by mild hydrodesulfurization, using as a catalyst, cobalt metal or oxide in slurry or in fixed bed form. The spent sulfided cobalt solids are then, in accordance with one embodiment of the invention, passed to the first stage aldehyde synthesis zone or in another embodiment, to a cobalt carbonyl preforming zone. It is one of the characteristics of the aldehyde synthesis reaction that it is not poisoned by sulfur. The sulfur is ultimately removed from the system in the various non-product streams, including the purge gas from both the aldehyde synthesis and the hydrogenation systems, in the unconverted hydrocarbon fraction and in the bottoms fraction. By means of this process, regeneration of cobalt sulfide into the cobalt metal is avoided and significant economies in the use of the strategic cobalt metal realized.

The present invention will best be understood from the more detailed description presented hereinafter wherein reference will be made to the accompanying drawings which are schematic illustrations of systems suitable for carrying out preferred embodiments of the invention.

Referring now to Figure I, wherein there is described a system wherein the sulfurized cobalt resulting from the desulfurization is employed to provide at least a portion of the initial catalyst in the primary aldehyde synthesis reaction zone, an olefinic hydrocarbon having one carbon atom less than the number of carbon atoms in the desired resulting alcohol is fed through feed line 2 to the bottom portion of primary reactor 4. Reactor 4 comprises a reaction vessel which may, if desired, be packed with non-catalytic material, such as, Raschig rings, porcelain chips, pumice and the like. The reactor is preferably divided into discrete packed zones separated by any suitable means, such as, support grids, though, if desired, it may contain but a single packed zone or it may contain no packing. Though the bulk of the catalyst will be supplied in a manner shown more clearly hereinafter, when starting up, 1 to 3% by weight of cobalt oleate based on the olefin, may be admitted through lines 6 and 8. This catalyst may be in the form of a concentrated solution of the cobalt salt dissolved in olefin feed. However, if desired, a slurry of a solid form of cobalt in olefin feed, such as, cobalt metal, cobalt oxide, carbonate, formate, acetate, or other readily available forms of metal, may be employed. Thus, another good method of starting up the operation is to inject into the aldehyde synthesis reactor 4, the olefin containing dissolved therein, 1 to 3% by weight of the cobalt oleate, naphthenate, etc., and then as the run proceeds, the dissolved or slurried cobalt is gradually cut back and the solid catalyst slurry from the hydrodesulfurizing stage is injected as disclosed more fully hereinafter. In general, it is desirable to preheat the olefin feed to about 300° F. prior to passage to reactor 4.

Simultaneously, a gas mixture containing hydrogen and carbon monoxide in the approximate ratio of about 0.5 to 2 vols. $H_2$ per vol. of $CO$ is supplied thorugh line 10 to primary reactor 4 and flows concurrently through the reactor with the liquid olefin feed with the dissolved, dispersed or slurried catalyst. Reactor 4 is operated at pressures of about 2000 to 4500 p. s. i. g. and temperatures of from about 275° to 450° F., preferably 300° to 375° F., depending upon the olefin feed and other reaction conditions. As a result of the reaction between cobalt and the synthesis gas, cobalt carbonyls are formed, and it is commonly believed to be the hydrocarbonyl which catalyzes the conversion of olefins to aldehydes.

Liquid oxygenated reaction products comprising aldehydes and carrying in suspension, finely-divided cobalt metal or other form of cobalt, as well as carrying in solution, cobalt carbonyl, are withdrawn from the upper portion of high pressure reactor 4 through line 12 and passed through cooler 14 wherein the total effluent is cooled to a temperature of about 50° to 150° F. and thence is passed to high pressure separator 16, wherein at least a partial separation of liquids and gases is obtained. The separated gases which include $H_2S$ derived from the sulfided cobalt employed in part as catalyst, are withdrawn overhead through line 18. A portion of this gas stream, which comprises besides sulfur-containing gases, also unreacted carbon monoxide and hydrogen, may be recycled to reactor 4 via a recycle compressor and line 20, inasmuch as sulfur-containing gases are not detrimental to the first stage process. The balance of the gas not recycled, may be purged from the system through line 22.

A stream of liquid aldehyde product containing, in solution, cobalt carbonyl, and which may contain in suspension solid forms of cobalt, is withdrawn through line 20 from separator 16. A portion of this cool withdrawn liquid is advantageously recycled to reactor 4, to control the temperature in the primary carbonylation zone, the amount of product recycled being a function of the amount of cooling required in the reactor. The recycled aldehyde product is preferably injected throughout the length of reactor 4, to maintain cooling uniformly in that zone. Approximately a total of 100 to 700 vol. percent of liquid recycle product on the fresh olefin feed may be used for this purpose.

The balance of the aldehyde product is withdrawn through pressure release valve 23, and through line 24, and is passed to catalyst removal zone 26, wherein, by suitable treatment, the dissolved cobalt carbonyl is decomposed and converted into other forms of cobalt at mildly elevated temperatures. One way of carrying out this decobalting may be by injecting steam or hot water into decobalting vessel 26, through line 28, at a temperature of about 200° to 400° F. and pressures of atmospheric up to 500 pounds. Another good way of decomposing the cobalt carbonyl is to add an inert purge gas, such as hydrogen through line 28. The result of the hydrogen treatment is to strip carbon monoxide from the aldehyde product, thus accelerating the decomposition of cobalt carbonyl. The gas stream, comprising hydrogen and $CO$ produced by decomposition of cobalt carbonyl, may be removed through line 30, and transferred to another portion of the system for further use.

Liquid aldehyde reaction product, now substantially free of carbonylation catalyst, is withdrawn from catalyst removal zone 26 through line 32 to solids recovery zone 34, wherein solid cobalt formed as a result of the thermal or other treatment in vessel 26, and unreacted solid cobalt added initially, is recovered either by settling, filtration, or other known means. This liquid aldehyde product, which may contain in solution, as much as 0.01 to 0.10% sulfur, is passed to the lower portion of hydrogenerator 36. Simultaneously, hydrogen is supplied to 36 through line 38, in proportions sufficient to convert the aldehyde product into the corresponding alcohols. The catalyst within 36 is preferably a sulfactive one, and an excellent catalyst is one comprising molybdenum sulfide supported on an activated carbon carrier. Hydrogenator 36 may be operated at pressures of from about 2500 to 4500 p. s. i. g. and at temperatures of from about 400° to 550° F., a liquid feed rate of about .25 to about 2 v./v./hr. and a hydrogen feed rate of from about 5000 to 20,000 normal cu. ft. per barrel of feed. It is also beneficial to add to the hydrogenation zone, up to 8 to 10% of water based on aldehyde to aid in the selectivity to alcohol product. The products of the hydrogenation reaction are withdrawn overhead through line 39, thence through cooler 40 into high pressure separator 42, where unreacted hydrogen may be withdrawn overhead through line 44, for further use in the system. The gas withdrawn through 44, as well as that withdrawn through line 30, may also contain sulfur impurities resulting from the sulfide catalyst introduced initially into reactor 4. Inasmuch as a sulfactive hydrogenation catalyst is employed in 36, recycling of unreacted hydrogen contaminated with minor amount of $H_2S$ is not detrimental.

Liquid products are withdrawn from separator 42 through line 46, and are passed to heads still 48, through pressure release valve 45. The crude alcohol product may have a comparatively high sulfur content of 50 to 1000 parts per million. If freshly prepared hydrogenation catalyst is employed, the sulfur content may be higher. This is true, even if the aldehyde feed to the hydrogenation zone had a lower sulfur content. In still 48, the low boilers, mostly hydrocarbons boiling below the desired alcohol product, are distilled overhead and may be used as a fuel blending agent.

The bottoms from this primary distillation are withdrawn through line 50, and passed to alcohol still 52, where product alcohol is removed overhead through line 54 by distillation at atmospheric or reduced pressures. The bottoms from the distillation may be further processed or used as fuel.

The recovered alcohol containing excessive quantities of sulfur in solution in the form of organically combined sulfur, mercaptans, sulfides, disulfides, etc., is passed, preferably after preheating to 200 to 600° F., to a lower portion of desulfurizing column 56. The latter is preferably operated countercurrently with the alcohol feed and hydrogen passing in countercurrent relationship to slurried hydrogenation catalyst in a manner to be described. Hydrogen may be admitted through lines 58 and 54. A slurry of cobalt metal or cobalt oxide in alcohol is introduced conveniently at an upper portion of 56 through line 60 and the alcohol and gas flow countercurrent to the solids. Reaction conditions within hydrodesulfurization zone 56 include temperatures of about 200° to 600° F., and pressures from 15 to 4000 p. s. i. g., and hydrogen flow rate of about 100–1000 cu. ft. per barrel. The lower ranges of reaction conditions are preferred, to avoid over-hydrogenation, that is, conversion of the alcohols to the corresponding hydrocarbons. In typical continuous operations, the desulfurization is carried out at about 100 p. s. i. g. pressure with a hydrogen rate of about 130 cu. ft. of hydrogen per barrel of alcohol fed and at liquid rates of 1–4 v./v./hr. Temperatures in the range of 255° to 300° F. are used. It is preferable to employ a hydrogen feed substantially free of carbon monoxide in order to avoid forming cobalt carbonyl. Quality improvement of the alcohol thus treated is measured by the ester color as determined from the absorbency of light of the phthalate ester and by the sulfur content of the alcohol product. In a typical experiment, using nickel rather than cobalt catalyst, it was found that sulfur removal was satisfactory at 1 v./v./hr. to yield a product containing 0 to 1 part per million in the product starting with initial alcohol feed containing 16 parts per million. This alcohol feed, before being subjected to desulfurization, had an ester color of 0.37. The products resulting from desulfurization at 1 v./v./hr., showed ester color of 0.04 to 0.07. The use of cobalt rather than nickel will produce equivalent results.

It is understood, of course, that desulfurization zone 56 may comprise, instead of the baffle tower 56, batch treaters, multiple agitated continuous reactors, and the like. The process can be carried out both batchwise and continuously. The purified alcohol product and hydrogen are withdrawn overhead through line 62, and passed to gas-liquid separator 64. Hydrogen is recovered through line 66, while the treated alcohol substantially completely free of sulfur, is withdrawn through line 68, for further distillation or treatment, if desired.

The slowly descending solid cobalt is withdrawn from the lower portion of hydrodesulfurization reactor 56, through line 70. The rate of withdrawal of the cobalt solids is at about the same rate as the addition of the slurry through line 60, which in turn, is responsive to the amount of sulfur in the alcohol being treated and the rate at which the catalyst becomes spent. The solid material comprising partially sulfided cobalt is in the form of a slurry with product alcohol. If desired, the withdrawn slurry may be passed through filtering or centrifugal means for adjusting the proportion of liquid to solid; in general, a slurry of about 1 to 10% of cobalt, may be employed. The slurry is pumped via lines 70 and 3 to carbonylation zone 4, wherein the cobalt solids are converted into cobalt carbonyl and products comprising hydrogen sulfide.

A typical alcohol product before treating may contain 50 p. p. m. sulfur. A typical yield of alcohol on olefin feed is 70 weight percent, and a typical Oxo stage catalyst rate is 0.3 weight percent cobalt on olefin feed. If the entire amount of Oxo stage catalyst is first passed through the hydrodesulfurization step, the sulfur to be removed amounts to about 1.2 weight percent of the cobalt fed. This corresponds to about 2.2% of the cobalt being converted to cobalt monosulfide, assuming no conversion of sulfur to H₂S. This degree of conversion of cobalt oxide or metal to sulfide should be accomplished without special preparation of the cobalt solids, as for example, in a finely subdivided form on a catalyst support. Commercial cobalt oxide (cobalt black) normally consists of particles in the range of 1–5 microns in diameter. This material should be suitable for direct use in preparing the slurry fed to the hydrodesulfurization step.

It will normally be advantageous to pass the entire Oxo stage cobalt catalyst requirement through the hydrodesulfurization stage in order to allow minimum conversion of cobalt to sulfide. This will promote maximum sulfur removal. If the sulfur level is very high, it might be necessary to use more cobalt in the desulfurization stage than can be handled in the Oxo stage. The excess cobalt solids might be roasted to remove sulfur and recycled to the desulfurization. This roasting step may advantageously be combined with the roasting of decobalter solids discussed below.

A particularly advantageous method of operation for utilizing partially sulfided cobalt as a carbonylation catalyst is shown in Figure II. In the figures that follow, equipment and lines corresponding to those shown in Figure I have been given the same numerical designation. In this embodiment, the spent sulfided cobalt hydrodesulfurization catalyst is not passed to the aldehyde synthesis reaction zone, but is passed instead, to a cobalt carbonyl preforming zone, i. e. a cobalt carbonyl generator. It has been established that the reaction between carbon monoxide and hydrogen and olefins is substantially faster in the presence of cobalt carbonyl than in the presence of a solid form of cobalt which first must be converted into the cobalt carbonyl. However, the temperatures at which solid forms of cobalt are most rapidly and completely converted into carbonyl in the presence of hydrogen and carbon monoxide are substantially lower than the temperature range in which cobalt carbonyl reacts with olefins, carbon monoxide and hydrogen. In accordance, therefore, with the present embodiment of the invention, the slurry, comprising sulfided cobalt, is passed through line 70, into cobalt carbonyl generation zone 72. Zone 72 may be a large soaking vessel. Aldehyde products carbon monoxide and hydrogen, suitably preheated, are also conveniently passed through line 74, to carbonyl generator 72. Reaction conditions within generator 72 include temperatures of about 100 to 300° F., preferably about 175° to 225° F., and pressures of 200 to 4500 p. s. i. g., and residence time sufficient to convert at least the major proportion of the cobalt solids into cobalt carbonyl. This residence time corresponds to a throughput rate of 0.05 to 1.0 v./v./hr. Overhead there is withdrawn a solution of cobalt carbonyl in aldehyde. This solution, which may contain 1–10 weight percent cobalt, is passed through line 76, to aldehyde synthesis reactor 4. Olefin and synthesis gas are passed to reactor 4 in manner and amount previously disclosed in connection with Figure I. The proportion of cobalt to olefin feed is about 0.1 to 0.3% cobalt. The temperatures within reactor 4 are maintained at about 300° to 375° F., which are conducive to the interaction of cobalt carbonyl, hydrogen, carbon monoxide and olefins, but are not as favorable for the production of cobalt carbonyl from solid forms of cobalt, such as, cobalt sulfide, oxide, or metal.

Figure III represents a particularly desirable form of operation when a thermal instead of a chemical decobalting process is employed and an inert gas used for stripping carbon monoxide from the catalyst decomposition zone. Aldehyde product from the high pressure separators is passed to thermal decobalter 26, and an inert gas, such as, hydrogen introduced through line 28, and the purge gas withdrawn from 30, as described in Figure I. A temperature of say 320° F., and pressure of 160 p. s. i. g., may be maintained within decobalter 26. The heat for the decobalting process may be supplied by recycling a portion of the aldehyde product after first passing through heater 78. In accordance with the present embodiment, a slurry of decobalter solids in aldehyde, these solids comprising essentially metallic cobalt, is withdrawn downwardly from 26, through line 80, and is passed to filter press 82. These decobalted solids normally contain a substantial percentage of finely-divided, loosely-agglomerated cobalt metal highly active as a hydrodesulfurization catalyst. The filtered aldehyde product withdrawn from filter 82, through line 84, is then passed to the hydrogenation stage for conversion to alcohols and subsequent hydrodesulfurization, as previously described, in connection with Figure I. The filter cake is then washed with the corresponding alcohol, the cake removed and the residue consisting of a large percentage of highly active finely-divided cobalt metal is slurried in alcohol product to provide a slurry of about 1 to 10% solid cobalt in the alcohol. This slurry is passed into the hydrodesulfurization zone through line 60 (Fig. I). By thus employing the recovered solid as a desulfurization catalyst, large savings in cobalt and cobalt processing are realized for the cobalt need not be converted into oil-soluble form for use in the process.

In the above embodiments, it was the distilled alcohol containing minor amounts of sulfur that was hydrodesulfurized. In Figure IV there is shown an embodiment of the invention wherein the crude alcohol rather than the distilled alcohol is hydrodesulfurized. In this embodiment, the aldehyde product from the gas-liquid separator is passed to thermal decobalting zone 26, where it is treated by means of a stripping gas and heat supplied by recycle of decobalted aldehyde product substantially as shown and described in connection with Figure III. The balance of the aldehyde product not recycled to the decobalter is passed via line 86 to a hydrogenation zone (not shown), wherein the aldehyde is hydrogenated under conditions described heretofore and the crude alcohol which may be contaminated not only with sulfur compounds, but also hydrocarbons, acetals, esters, polymeric material, and the like, is passed via line 88, to the lower portion of hydrodesulfurization zone 56, hydrogen being admitted through line 58. A slurry of decobalter solids in aldehyde is withdrawn from the lower portion of decobalter 26, through line 80, and is passed directly to the upper portion of hydrodesulfurization unit 56. Because of the small amount of aldehyde involved in the slurry, vessel 56 is operated substantially as described heretofore, and the slurry of sulfided solids in crude alcohol is withdrawn downwardly through line 70, and is recycled as before, either to the aldehyde synthesis stage or to the cobalt carbonyl generator. Overhead through line 90, the crude alcohol product is withdrawn, sent to primary distillation zone 92, for removal of the heads cut comprising low boiling materials, hydrocarbons, and the like. The bottoms from this distillation are passed through line 94, to alcohol distillation zone 96, wherein the sulfur-uncontaminated alcohol is drawn overhead through line 98, and bottoms removed downwardly through 99, substantially as described in connection with Figure I.

The embodiments of this invention shown in Figures III and IV are especially desirable since they allow continuous recycle of cobalt through the synthesis, decobalting, and desulfurization stages. Thus, the sulfur removal can be effectively accomplished without the expense of supplying additional catalyst. This is extremely advantageous from the economic point of view, particularly compared to conventional alcohol desulfurization using nickel. Some cobalt losses occur in the system, and it is advantageous to feed the fresh make-up cobalt to the desulfurization stage. The fresh catalyst might even be used in a clean-up desulfurization stage following initial desulfurization with decobalter solids.

The decobalter solids are partially coated with a polymeric material believed to be largely aldehyde condensation products. It may be desirable to take all or part of the decobalter solids stream and remove the polymeric matter therefrom prior to feeding the solids to the desulfurization stage. This may be accomplished by roasting the solids, burning the organic polymers and converting the cobalt metal to oxide. Alternately, the solids may be washed with a polar solvent such as methyl ethyl ketone to dissolve the polymer.

Contacting the decobalter solids with crude alcohol or product alcohol as in Figures III and IV is an advantage from the point of view of recycling these solids to the Oxo stage. The polymeric material on the solids tends to prevent rapid and complete dissolution of these solids in the Oxo stage. The desulfurization step tends to dissolve the polymers off the solids, particularly when product alcohol is employed. The crude aldehyde in the decobalter is an inferior solvent because the oxygenated compounds at this point are largely combined into high molecular weight, non-polar molecules, such as, acetals.

This difference in solvent properties is evidenced by the fact that water is over twice as soluble in crude $C_8$ alcohol as in crude $C_8$ aldehyde, and the water solubility in product alcohol is even higher than in crude alcohol. The polymeric material dissolving in the alcohol is, of course, removed in the subsequent distillation stage.

Other modifications apparent to those skilled in the art are within the scope of the invention. Thus, instead of employing a slurry of cobalt solids for the hydrodesulfurization stage, it may be desirable to pass the alcohol product through a fixed bed of cobalt metal or oxide. Then when the bed is spent, the latter may advantageously be employed as a cobalt carbonyl generator. This is accomplished by passing carbon monoxide, hydrogen and aldehyde or olefin through the bed under temperatures between 100° and 300° F., preferably about 175 to 225° F., and pressures of about 200 to 4500 p. s. i. g. Under these conditions, cobalt carbonyl or hydrocarbonyl is formed from the spent cobalt solids and is dissolved in the carrying liquid without substantial reaction between the liquid and the carbonyl. With the use of multiple beds of this type, a continuous cyclical type of operation is thus made possible.

What is claimed is:

1. In a carbonylation process wherein olefins, CO and $H_2$ are contacted in an initial carbonylation zone with a cobalt carbonylation catalyst under conditions to produce oxygenated reaction products comprising aldehydes, and wherein said reaction products are further subjected to a hydrogenation reaction in the presence of a sulfactive hydrogenation catalyst to produce an alcohol product having one more carbon atom than said olefins, and wherein said alcohol product is contaminated with sulfur-containing impurities, the improvement which comprises contacting said alcohol product at a temperature of about 200–600° F. with cobalt-comprising solids in the presence of a stream of hydrogen, converting at least a portion of said cobalt to a sulfide and concomitantly substantially freeing said alcohol product from said sulfur impurities, recovering a purified alcohol product, converting sulfur-contaminated cobalt to cobalt carbonyl, and employing said carbonyl as carbonylation catalyst in said carbonylation zone.

2. In a carbonylation process wherein olefins, CO and $H_2$, are contacted in an initial carbonylation zone with a cobalt carbonylation catalyst under conditions to produce oxygenated reaction products comprising aldehydes, and wherein said reaction products are further subjected to a hydrogenation reaction in the presence of a sulfactive hydrogenation catalyst to produce a crude alcohol product having one more carbon atom than said olefins and wherein said crude alcohol product is distilled and wherein said distilled alcohol product is contaminated with sulfur-containing impurities, the improvement which comprises contacting said distilled contaminated alcohol product in a desulfurizing zone at a temperature of about 200–600° F. with finely-divided cobalt-comprising solids in the presence of a stream of hydrogen, whereby said alcohol product is desulfurized and said cobalt solids are in part sulfided, recovering a purified alcohol product, withdrawing a slurry of sulfided cobalt solids, and passing said solids to the system to supply at least a portion of the carbonylation catalyst requirements therefor.

3. The process of claim 2 wherein said solids are passed to said carbonylation zone.

4. The process of claim 2 comprising passing said sulfided solids to a reaction zone, passing aldehyde product, $H_2$ and CO, to said zone, maintaining a temperature and pressure of about 100–300° F. and 200–4500 p. s. i. g. respectively in said zone, converting said sulfided cobalt to cobalt carbonyl, and passing an effluent comprising cobalt carbonyl dissolved in aldehyde product to said carbonylation zone.

5. The process of claim 2 wherein the amount of cobalt added to said desulfurizing zone is adequate to supply the catalytic requirements of said carbonylation zone.

6. In the process of claim 2, the steps comprising passing aldehyde product and dissolved cobalt carbonyl from said carbonylation zone to a decobalting zone, thermally treating said material in said last-named zone to decompose said cobalt carbonyl to a product comprising finely-divided cobalt metal, withdrawing finely-divided cobalt from said zone, forming a slurry of said cobalt in said alcohol product, and passing said slurry of highly reactive finely-divided cobalt in alcohol to said desulfurization zone.

7. In a carbonylation process wherein olefins, CO and $H_2$ are contacted in an initial carbonylation zone with a cobalt catalyst to produce aldehydes, and wherein said aldehydes are freed from dissolved cobalt in a decobalting zone, and wherein said aldehydes are reduced in a hydrogenation zone in the presence of a sulfactive hydrogenation catalyst to form a sulfur-contaminated crude alcohol product, the improvement which comprises passing said crude alcohol product prior to distillation to a desulfurization zone, withdrawing from said decobalting zone a slurry of finely-divided cobalt-comprising solids in aldehyde product, passing said slurry to said desulfurization zone, passing hydrogen to said zone, maintaining temperatures of about 200–600° F. in said zone, desulfurizing said crude alcohol product and sulfiding said cobalt solids, passing crude hydrodesulfurized alcohol product to a distillation zone, recovering a purified alcohol product, withdrawing spent cobalt solids from said desulfurization zone and passing said solids to said system to supply the carbonylation catalyst requirements in said carbonylation zone.

8. The process of claim 7 wherein said solids withdrawn from said decobalter zone are freed from polymer contaminants prior to passing them to said desulfurization zone.

9. The process of claim 8 wherein said solids are solvent extracted to remove said polymeric contaminants.

10. The process of claim 8 wherein said solids are roasted to remove said polymeric contaminants.

References Cited in the file of this patent

UNITED STATES PATENTS

| | | |
|---|---|---|
| 2,560,415 | Cornell | July 10, 1951 |
| 2,560,433 | Gilbert et al. | July 10, 1951 |
| 2,569,671 | Hughes | Oct. 2, 1951 |
| 2,581,988 | Spijker et al. | Jan. 8, 1952 |
| 2,587,576 | Field et al. | Mar. 4, 1952 |

FOREIGN PATENTS

| | | |
|---|---|---|
| 644,665 | Great Britain | Oct. 18, 1950 |